United States Patent
Sreedhar et al.

(10) Patent No.: US 11,775,200 B2
(45) Date of Patent: Oct. 3, 2023

(54) CONTROL BLOCK MANAGEMENT IN STORAGE DEVICES

(71) Applicant: Western Digital Technologies, Inc., San Jose, CA (US)

(72) Inventors: Adarsh Sreedhar, Bangalore (IN); Niraj Srimal, Bangalore (IN); Ramanathan Muthiah, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 9 days.

(21) Appl. No.: 17/234,324

(22) Filed: Apr. 19, 2021

(65) Prior Publication Data
US 2022/0334755 A1  Oct. 20, 2022

(51) Int. Cl.
G06F 3/06 (2006.01)

(52) U.S. Cl.
CPC .......... *G06F 3/0655* (2013.01); *G06F 3/0604* (2013.01); *G06F 3/0644* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 10,296,250 B2 | 5/2019 | Walker et al. | |
| 10,430,329 B2 | 10/2019 | Sun et al. | |
| 10,503,404 B2 | 12/2019 | Frolikov | |
| 10,698,635 B2 | 6/2020 | Jin | |
| 10,782,879 B2 | 9/2020 | Kanno | |
| 11,132,140 B1* | 9/2021 | Benjamin | G06F 3/0619 |
| 2015/0095555 A1* | 4/2015 | Asnaashari | G06F 12/0246 711/114 |
| 2016/0210241 A1* | 7/2016 | Jacobs | G06F 12/0246 |
| 2017/0060918 A1* | 3/2017 | Iyer | G06F 3/0665 |
| 2018/0260135 A1 | 9/2018 | Hayashida et al. | |
| 2021/0326054 A1* | 10/2021 | Jayaraman | G06F 3/0644 |

OTHER PUBLICATIONS

Kang et al. "A Superblock-based Flash Translation Layer for NAND Flash Memory." Oct. 2006. ACM. EMSOFT'06. pp. 161-170.*

* cited by examiner

*Primary Examiner* — Nathan Sadler
(74) *Attorney, Agent, or Firm* — Ravi Mohan; Rutan & Tucker, LLP

(57) ABSTRACT

Storage devices store not only host data, but also control data related to operations of the storage device associated with the data. Control data is stored within blocks of memory called control blocks. As storage devices are configured to communicate with numerous hosts and namespaces, proper management of the available control blocks can avoid numerous problems such as mixed control block usage that punish certain hosts based on actions of other, non-related hosts. Methods and devices that efficiently manage control blocks include a control block management logic configured to process a request to generate a new namespace and parse the namespace request to determine the number of control blocks required. These separate control blocks for the requested namespace can be partitioned. Finally, control block activity for the requested namespace is directed only to the partitioned control blocks. Thus, the various control block activity between hosts is separate and not mixed.

16 Claims, 10 Drawing Sheets

CONTROL BLOCK MANAGEMENT IN STORAGE DEVICES

FIELD

The present disclosure relates to storage systems. More particularly, the present disclosure relates to analyzing and dynamically managing control blocks within storage devices to avoid garbage collection and improve overall performance.

BACKGROUND

Storage devices are ubiquitous within computing systems. Recently, solid-state storage devices have become increasingly common. These nonvolatile storage devices can communicate and utilize various protocols including non-volatile memory express (NVMe), and peripheral component interconnect express (PCIe) to reduce processing overhead and increase efficiency.

As processing capabilities have grown, the use of virtual machines has also increased. Virtual machines are an emulation of a computer system that is itself processed and executed as part of another computer system to provide functionality similar to that of a traditional physical computing device. It is becoming more common for various companies to utilize their available computing resources to provide virtual machines to customers as a service, typically over the Internet or as part of a "cloud" service. Once established, a virtual machine may act as a virtual host when communicating with one or more storage devices.

It has also then become increasingly more common for a storage device to be in communication with a multitude of hosts, including virtual hosts. Each of these virtual hosts may be sending various commands to read and/or write data to the storage device (i.e., write and read streams). Often, the storage device may be partitioned into zones that are assigned to a single host. One common method of partitioning these zones is through the utilization of the "namespace" feature of the NVMe specification. The use of namespaces can allow for the routing of streams of data into different groups of memory blocks or other storage media based on the desired application of the host and parameters supplied to the storage device.

To facilitate the operation of storage device and ensure smooth operation with the host, a series of control data is created and stored on the storage device. Control data can include data used to translate data read and write command sent from the host to operations that directly affect memory devices within the storage device. This can include, for example, logical-to-physical data, uninstallation and other input/output discarded data related to each namespace. This control data is often stored within a common pool of control blocks. However, as control data is invalidated and/or the pool of control blocks becomes too small, garbage collection processes can occur which affect storage device performance.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
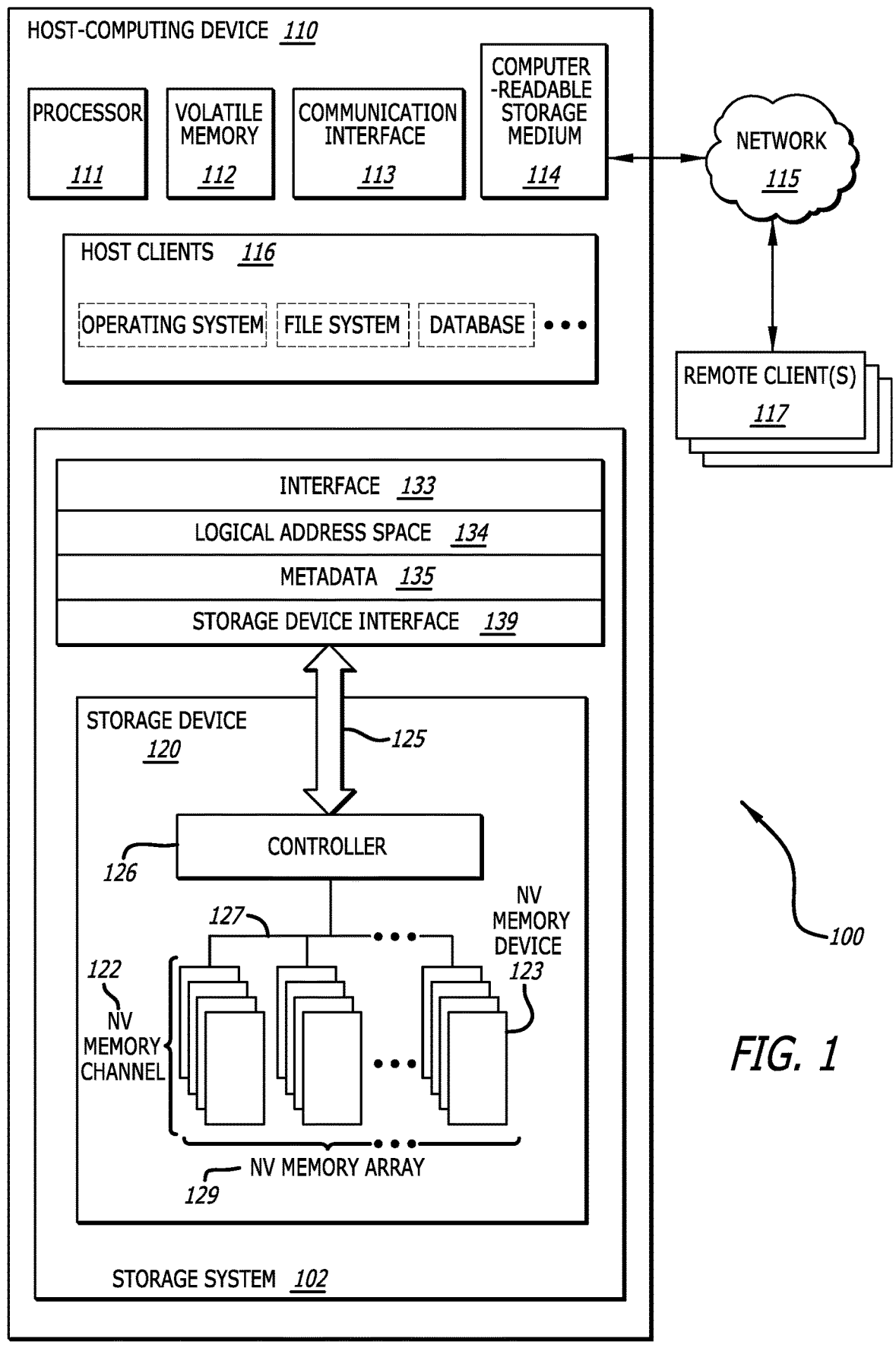
FIG. 1 is schematic block diagram of a host-computing device with a storage device suitable for control block management in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, devices and methods are discussed herein that manage control blocks by determining and partitioning separate control blocks for logical namespaces. In many embodiments, the storage device can dedicate control blocks for every logical namespace with similar data-pattern usage. In some embodiments, the namespaces may include zoned or other namespaces. This can enhance performance of each dedicated region as they are independent from each other and avoid being affected by usage patterns of other hosts interacting with the same storage device.

In many instances, certain logical namespaces may write and store data via sequential usage and/or have a limited number of overwrites to their stored data. This can similarly affect the control blocks as the control data associated with the namespace will also likely be stored sequentially within the control block. Other logical namespaces may operate in a more random fashion and store data in a non-sequential order and/or utilize a relatively high-number of overwrites. In this way, the corresponding control data is also likely stored in a random order and can necessitate the need to compact, or garbage collect the corresponding control blocks more frequently. Because these operations can negatively affect the performance of the storage device, these operations are only executed when needed. Various embodiments of the disclosure attempt to minimize the compaction, write amplification, and corresponding processing overhead of control blocks in response to uninstallation and/or invalidation/overwriting of data within namespaces configured on the storage device.

In many embodiments, a host in communication with a storage device can submit a request for a new namespace along with the requested size and/or other additional tags. The firmware of the storage device can then earmark a region of physical media (memory devices) for that requested namespace. The host can then issue subsequent requests and commands to read and write data using the namespace identification and the logical address within it, which the storage device can convert to a flat logical block address and route the data to the corresponding region within the memory array, finally making a logical-to-physical entry within a table stored in a control block.

Additional measures such as the use of sub-blocks when available, and machine learning processing evaluation data that can be stored on the storage device can also further avoid any garbage collection and compaction issues within the pool of control blocks. Sub-blocks may be utilized to generate sub-control blocks that better reduce the amount of control blocks required for use by multiple separate namespaces. The use of sub-control blocks may also allow for more precise partitioning of data with expiration dates. The more sub-blocks available, the more granular the various time differences between various expiring data can be.

The storage device may also be able to determine or receive one or more indications of use of the namespace. The indications of use may be related to the sequential or non-sequential (i.e., random) usage of the memory devices. Indications of use may also relate to the expected expiration time of the data to be stored. Indications of use may also be utilized to better calculate a proper number of control blocks necessary for the namespace. These indications of use can be received as direct tags within a namespace generation command. In further embodiments, the indications of use can be generated within the storage device by using a set of fixed heuristics, or be utilizing machine learning. Machine learning processes can evaluate all available data which can include historical use data within the storage device that is captured in response to each namespace generation command and/or past read/write commands issued to one or more namespaces. In this way, the machine learning processes can better evaluate the potential usage pattern of a requested namespace based on previous interactions between the host and storage device.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic block diagram of a host-computing device 110 with a storage system 102 suitable for control block management in accordance with an embodiment of the disclosure is shown. The control block management system 100 comprises one or more storage devices 120 of a storage system 102 within a host-computing device 110 in communication via a controller 126. The host-computing device 110 may include a processor 111, volatile memory 112, and a communication interface 113. The processor 111 may include one or more central processing units, one or more general-purpose processors, one or more application-specific processors, one or more virtual processors (e.g., the host-computing device 110 may be a virtual machine operating within a host), one or more processor cores, or the like. The communication interface 113 may include one or more network interfaces configured to communicatively couple the host-computing device 110 and/or controller 126 of the storage device 120 to a communication network 115, such as an Internet Protocol (IP) network, a Storage Area Network (SAN), wireless network, wired network, or the like.

The storage device 120, in various embodiments, may be disposed in one or more different locations relative to the host-computing device 110. In one embodiment, the storage device 120 comprises one or more non-volatile memory devices 123, such as semiconductor chips or packages or other integrated circuit devices disposed on one or more printed circuit boards, storage housings, and/or other mechanical and/or electrical support structures. For example, the storage device 120 may comprise one or more direct inline memory module (DIMM) cards, one or more expansion cards and/or daughter cards, a solid-state-drive (SSD) or other hard drive device, and/or may have another memory and/or storage form factor. The storage device 120 may be integrated with and/or mounted on a motherboard of the host-computing device 110, installed in a port and/or slot of the host-computing device 110, installed on a different host-computing device 110 and/or a dedicated storage appliance on the network 115, in communication with the host-computing device 110 over an external bus (e.g., an external hard drive), or the like.

The storage device 120, in one embodiment, may be disposed on a memory bus of a processor 111 (e.g., on the same memory bus as the volatile memory 112, on a different memory bus from the volatile memory 112, in place of the volatile memory 112, or the like). In a further embodiment, the storage device 120 may be disposed on a peripheral bus of the host-computing device 110, such as a peripheral component interconnect express (PCI Express or PCIe) bus such, as but not limited to a NVM Express (NVMe) interface, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the storage device 120 may be disposed on a communication network 115, such as an Ethernet network, an Infiniband network, SCSI RDMA over a network 115, a storage area network (SAN), a local area network (LAN), a wide area network (WAN) such as the Internet, another wired and/or wireless network 115, or the like.

The host-computing device 110 may further comprise computer-readable storage medium 114. The computer-readable storage medium 114 may comprise executable instructions configured to cause the host-computing device 110 (e.g., processor 111) to perform steps of one or more of the methods disclosed herein.

A device driver and/or the controller 126, in certain embodiments, may present a logical address space 134 to the host clients 116. As used herein, a logical address space 134 refers to a logical representation of memory resources. The logical address space 134 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the storage device 120 may maintain metadata 135, such as a logical to physical address mapping structure, to map logical addresses of the logical address space 134 to media storage locations on the storage device(s) 120. A device driver may be configured to provide storage services to one or more host clients 116. The host clients 116 may include local clients operating on the host-computing device 110 and/or remote clients 117 accessible via the network 115 and/or communication interface 113. The host clients 116 may include, but are not limited to: operating systems, file systems, database applications, server applications, kernel-level processes, user-level processes, applications, and the like.

In many embodiments, the host-computing device 110 can include a plurality of virtual machines which may be instantiated or otherwise created based on user-request. As will be understood by those skilled in the art, a host-computing device 110 may create a plurality of virtual machines configured as virtual hosts which is limited only on the available computing resources and/or demand. A hypervisor can be available to create, run, and otherwise manage the plurality of virtual machines. Each virtual machine may include a plurality of virtual host clients similar to host clients 116 that may utilize the storage system 102 to store and access data.

The device driver may be further communicatively coupled to one or more storage systems 102 which may include different types and configurations of storage devices 120 including, but not limited to: solid-state storage devices, semiconductor storage devices, SAN storage resources, or the like. The one or more storage devices 120 may comprise one or more respective controllers 126 and non-volatile memory channels 122. The device driver may provide access to the one or more storage devices 120 via any compatible protocols or interface 133 such as, but not limited to, SATA and PCIe. The metadata 135 may be used to manage and/or track data operations performed through the protocols or interfaces 133. The logical address space 134 may comprise a plurality of logical addresses, each corresponding to respective media locations of the one or more storage devices 120. The device driver may maintain metadata 135 comprising any-to-any mappings between logical addresses and media locations.

A device driver may further comprise and/or be in communication with a storage device interface 139 configured to transfer data, commands, and/or queries to the one or more storage devices 120 over a bus 125, which may include, but is not limited to: a memory bus of a processor 111, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 115, Infiniband, SCSI RDMA, or the like. The storage device interface 139 may communicate with the one or more storage devices 120 using input-output control (IO-CTL) command(s), IO-CTL command extension(s), remote direct memory access, or the like.

The communication interface 113 may comprise one or more network interfaces configured to communicatively couple the host-computing device 110 and/or the controller 126 to a network 115 and/or to one or more remote clients 117 (which can act as another host). The controller 126 is part of and/or in communication with one or more storage devices 120. Although FIG. 1 depicts a single storage device 120, the disclosure is not limited in this regard and could be adapted to incorporate any number of storage devices 120.

The storage device 120 may comprise one or more non-volatile memory devices 123 of non-volatile memory channels 122, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory devices 123 of the non-volatile memory channels 122, in certain embodiments, comprise storage class memory (SCM) (e.g., write in place memory, or the like).

While the non-volatile memory channels 122 are referred to herein as "memory media," in various embodiments, the non-volatile memory channels 122 may more generally comprise one or more non-volatile recording media capable of recording data, which may be referred to as a non-volatile memory medium, a non-volatile memory device, or the like. Further, the storage device 120, in various embodiments, may comprise a non-volatile recording device, a non-volatile memory array 129, a plurality of interconnected storage devices in an array, or the like.

The non-volatile memory channels 122 may comprise one or more non-volatile memory devices 123, which may include, but are not limited to: chips, packages, planes, die, or the like. A controller 126 may be configured to manage data operations on the non-volatile memory channels 122, and may comprise one or more processors, programmable processors (e.g., FPGAs), ASICs, micro-controllers, or the like. In some embodiments, the controller 126 is configured to store data on and/or read data from the non-volatile memory channels 122, to transfer data to/from the storage device 120, and so on.

The controller 126 may be communicatively coupled to the non-volatile memory channels 122 by way of a bus 127. The bus 127 may comprise an I/O bus for communicating data to/from the non-volatile memory devices 123. The bus 127 may further comprise a control bus for communicating addressing and other command and control information to the non-volatile memory devices 123. In some embodiments, the bus 127 may communicatively couple the non-volatile memory devices 123 to the controller 126 in parallel. This parallel access may allow the non-volatile memory devices 123 to be managed as a group, forming a non-volatile memory array 129. The non-volatile memory devices 123 may be partitioned into respective logical memory units (e.g., logical pages) and/or logical memory divisions (e.g., logical blocks). The logical memory units may be formed by logically combining physical memory units of each of the non-volatile memory devices 123.

The controller 126 may organize a block of word lines within a non-volatile memory device 123, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of a block within a non-volatile memory device 123 may be physically arranged in a monotonically increasing sequence of word line addresses, with consecutively addressed word lines also being physically adjacent (e.g., WL0, WL1, WL2, . . . WLN).

The controller 126 may comprise and/or be in communication with a device driver executing on the host-computing device 110. A device driver may provide storage services to the host clients 116 via one or more interfaces 133. A device driver may further comprise a storage device interface 139 that is configured to transfer data, commands, and/or queries to the controller 126 over a bus 125, as described above.

Figure 2:
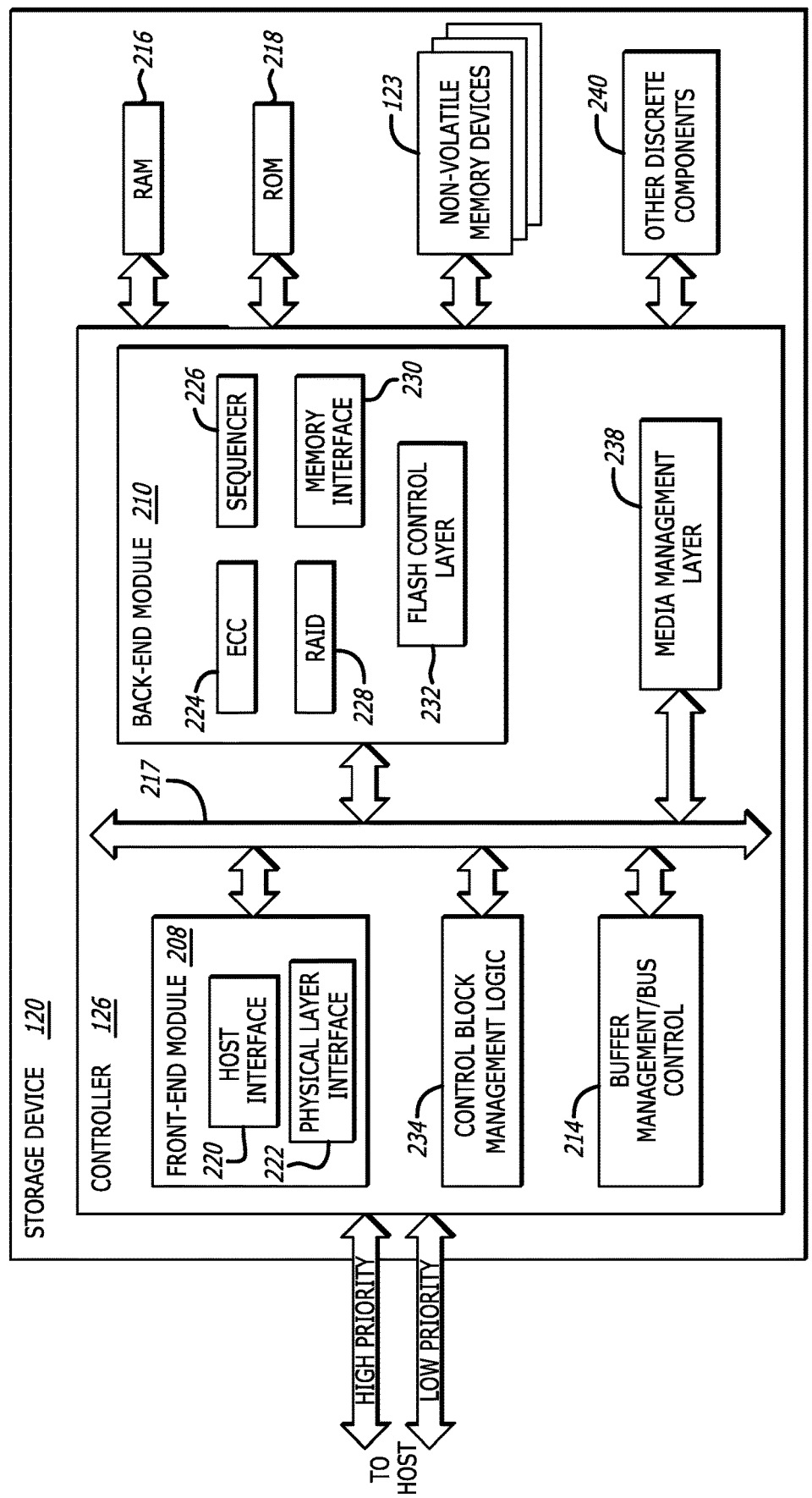
FIG. 2 is a schematic block diagram of a storage device suitable for control block management in accordance with an embodiment of the disclosure.

Referring to FIG. 2, a schematic block diagram of a storage device 120 suitable for control block management in accordance with an embodiment of the disclosure. The controller 126 may include a front-end module 208 that interfaces with a host via a plurality of high priority and low priority communication channels, a back-end module 210 that interfaces with the non-volatile memory devices 123, and various other modules that perform various functions of the storage device 120. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 126 may include a buffer management/bus control module 214 that manages buffers in random access memory (RAM) 216 and controls the internal bus arbitration for communication on an internal communications bus 217 of the controller 126. A read only memory (ROM) 218 may store and/or access system boot code. Although illustrated in FIG. 2 as located separately from the controller 126, in other embodiments one or both of the RAM 216 and the ROM 218 may be located within the controller 126. In yet other embodiments, portions of RAM 216 and ROM 218 may be located both within the controller 126 and outside the controller 126. Further, in some implementations, the controller 126, the RAM 216, and the ROM 218 may be located on separate semiconductor dies. As discussed below, in one implementation, the submission queues and the completion queues may be stored in a controller memory buffer, which may be housed in RAM 216.

Additionally, the front-end module 208 may include a host interface 220 and a physical layer interface 222 that provides the electrical interface with the host or next level storage controller. The choice of the type of the host interface 220 can depend on the type of memory being used. Examples types of the host interfaces 220 may include, but are not limited to, SATA, SATA Express, SAS, Fibre Channel, USB, PCIe, and NVMe. The host interface 220 may typically facilitate transfer for data, control signals, and timing signals.

The back-end module 210 may include an error correction controller (ECC) engine 224 that encodes the data bytes received from the host and decodes and error corrects the data bytes read from the non-volatile memory devices 123. The back-end module 210 may also include a command sequencer 226 that generates command sequences, such as program, read, and erase command sequences, to be transmitted to the non-volatile memory devices 123. Additionally, the back-end module 210 may include a RAID (Redundant Array of Independent Drives) module 228 that manages generation of RAID parity and recovery of failed data. The RAID parity may be used as an additional level of integrity protection for the data being written into the storage device 120. In some cases, the RAID module 228 may be a part of the ECC engine 224. A memory interface 230 provides the command sequences to the non-volatile memory devices 123 and receives status information from the non-volatile memory devices 123. Along with the command sequences and status information, data to be programmed into and read from the non-volatile memory devices 123 may be communicated through the memory interface 230. A flash control layer 232 may control the overall operation of back-end module 210.

Additional modules of the storage device 120 illustrated in FIG. 2 may include a media management layer 238, which performs wear leveling of memory cells of the non-volatile memory devices 123. The storage device 120 may also include other discrete components 240, such as external electrical interfaces, external RAM, resistors, capacitors, or other components that may interface with controller 126. In alternative embodiments, one or more of the RAID modules 228, media management layer 238 and buffer management/bus control module 214 are optional components that may not be necessary in the controller 126.

Finally, the controller 126 may also comprise a control block management logic 234. In many embodiments, the control block management logic 234 can be configured to process a request to generate a new namespace. In many embodiments, the request for a new namespace is based upon the specification of NVMe. However, it is contemplated that a namespace request may be supplemented beyond the NVMe specification by adding one or more indications of use as tags including, but not limited to, projected usage pattern (sequential vs. random), and/or data expiration time. The control block management logic 234 can also be configured to parse that namespace request for such tags and other indications of use.

Once parsed, the control block management logic 234 can partition separate control blocks for the requested namespace. Often, the separate control blocks are control blocks that have not been previously used or are otherwise fully erased prior to partitioning. In certain embodiments, previously used or mixed control blocks may be written to the general pool of control blocks sequentially. In these embodiments, the control block management logic 234 may direct the partitioning of separate control blocks to be toward the end of the general pool of control blocks to ensure both unused control blocks, but also to provide room to grow if it is later determined that more control blocks are needed than that originally determined.

Once partitioned, the control blocks can then be assigned to the requested namespace. The control block management logic 234 can then limit further control block activity for the partitioned control blocks to only the control data associated with the requested namespace. In some embodiments, the partitioned control blocks are associated with multiple namespaces that have data expiring at similar times. Thus, the control blocks are limited to only those namespaces with similar expiration times. The amount of similarity may dynamically adjust based on a variety of factors including, but not limited to, the availability of sub-control blocks, the number of remaining available control blocks, the amount of time between expirations, etc.

In a variety of embodiments, the control block management logic 234 can also establish if there are any indications of use prior to determining the number of control blocks required for a newly requested namespace. These indications of use may come from the host or may be generated internally within the storage device. Indications of use may, for example, relate to the potential expiration time of the data, and/or the intended use of the namespace.

Figure 3:
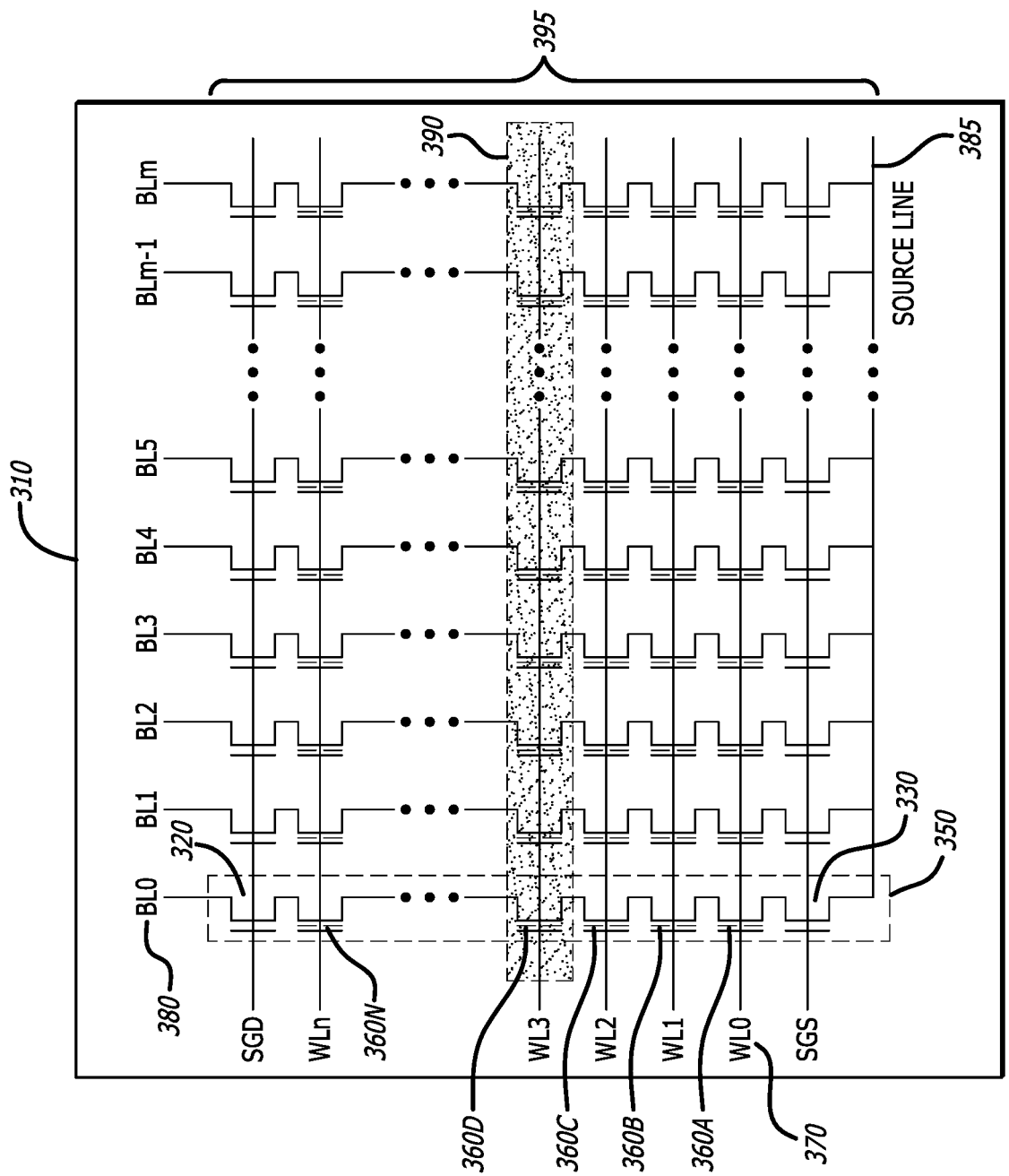
FIG. 3 is a conceptual schematic diagram of a two-dimensional memory array in accordance with an embodiment of the disclosure.

Referring to FIG. 3, a conceptual schematic diagram of a two-dimensional memory array 310 in accordance with an embodiment of the invention is shown. Memory devices, such as those depicted in FIGS. 1 and 2, may be arranged in two or three dimensions, such as a two-dimensional memory array or a three-dimensional memory array. FIG. 3 is a schematic diagram of one example of a two-dimensional memory array 310, such as a 2D or planar NAND memory array. The two-dimensional memory array 310 includes a set of NAND strings 350. Each NAND string 350 comprises a memory cells 360A, 360B, 360C, 360D to 360N. Each NAND string 350 includes a select gate drain transistor (SGD) 320 and a select gate source transistor (SGS) 330. The two-dimensional memory array 310 includes multiple pages 390. Page 390 is accessed by the control gates of the cells of the page connected in common to a word line 370 and each cell accessible via bit lines 380. In other embodiments, the memory cells may be arranged in other configurations. The sum of these groups of pages is considered a block 395. The memory block 395 can also be further arranged and configured with other memory blocks to generate larger memory structures as described in more detail below.

Figure 4:
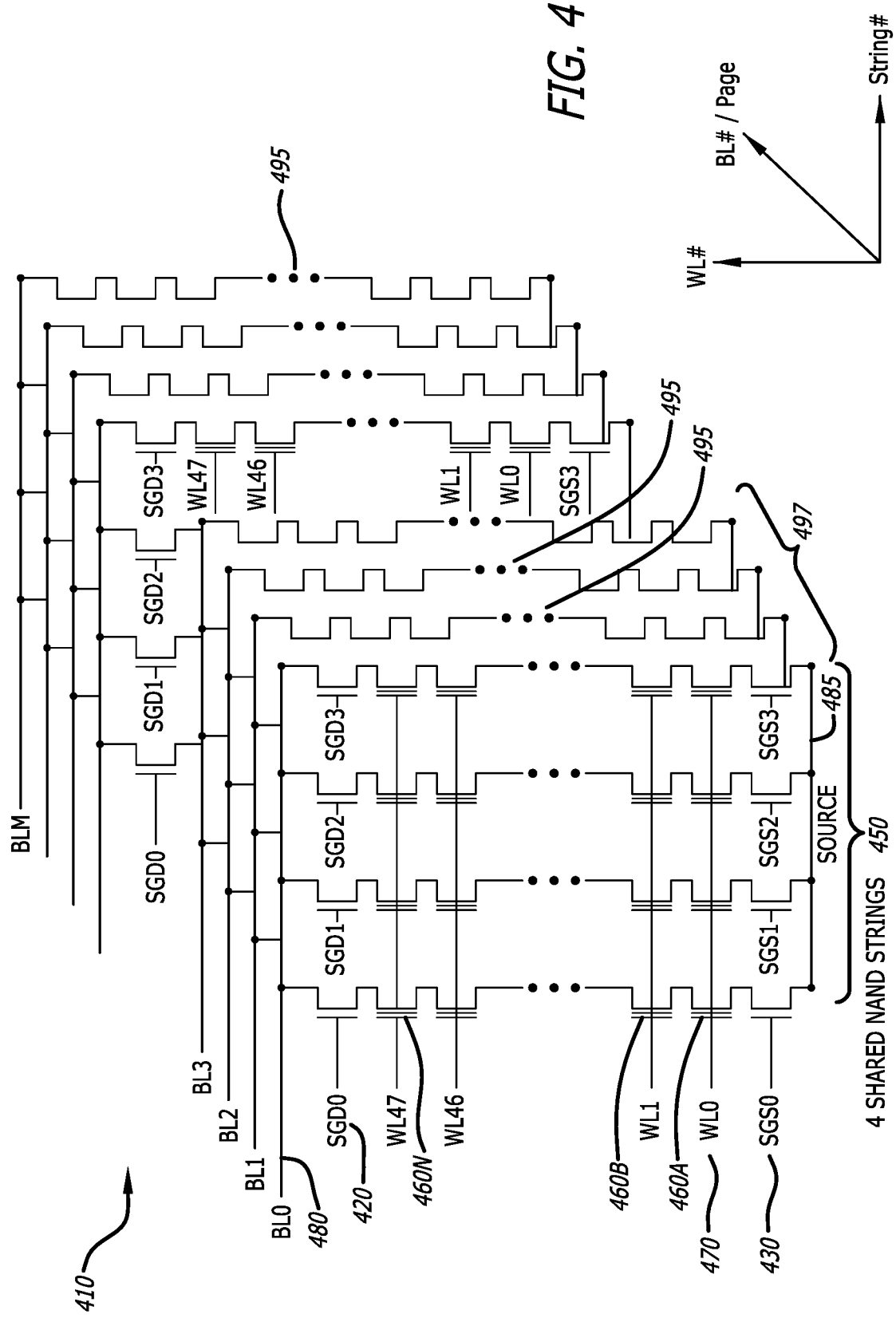
FIG. 4 is a conceptual schematic diagram of a three-dimensional memory array in accordance with an embodiment of the disclosure.

Referring to FIG. 4, a conceptual schematic diagram of a three-dimensional memory array 410 in accordance with an embodiment of the invention is shown. More specifically, FIG. 4 is a schematic diagram of one example of a three-dimensional memory array 410, such as a 3D or vertical NAND memory array or a BiCS2 cell array. In many embodiments, a three-dimensional memory array 410 can made up of a plurality of blocks 497 which are themselves comprised of a plurality of memory blocks 495 and pages. Each block 495 may include a series of pages and a corresponding set of NAND strings 450 (four NAND strings are shown but more may be present in various embodiments). Each set of NAND strings 450 is typically connected in common to a bit line 480. Each NAND string 450 may also include a select gate drain transistor (SGD) 420, a plurality of memory cells 460A, 460B, 460N, and a select gate source transistor (SGS) 430. A row of memory cells is connected in common to a word line 470.

The memory cells 360, 460 shown within the embodiments depicted in FIGS. 3 and 4 are often comprised of a transistor that has a charge storage element to store a given amount of charge representing one or more memory states. The memory cells may be operated in a single-level cell (SLC) storing 1 bit of memory per cell, an MLC or X2 cell storing 2 bits of memory per cell, a tri-level cell (TLC) storing 3 bits of memory per cell, a quad-level cell (QLC) storing 4 bits of memory per cell, or any types of memory cell storing any number of bits per cell. The SGDs 320, 420 and SGSs 330, 430 are depicted as transistors where the voltage levels are also programmed to a certain threshold voltage level. SGDs 320, 420 connect or isolate the drain terminals of the NAND strings 350, 450 to the bit lines 380, 480. SGSs 330, 430 can connect or isolate the source terminals of the NAND strings 350, 450 to source lines 385, 485. The SGDs and SGSs can be configured to condition the word lines 370, 470 for read, program, and erase operations.

To read the data correctly from memory cells 360, 460 in a NAND configuration, threshold voltage distributions should be at their proper states within word lines, SGDs, and SGSs. Within many embodiments, the storage devices can be programmed (i.e., have data written to the memory devices) in units as small as one page 390, such as shown in FIG. 3. However, in a variety of embodiments, the data stored within the storage device can only be erased in units as small as blocks 395, 495. This often leads to a lopsided usage pattern wherein data may be written in small increments, but only erased in large increments.

The result of this usage pattern leads to many scenarios that require erasure of a block that is not entirely filled with data. In other cases, valid data (i.e., data not selected for deletion) resides within a block with other data scheduled for deletion. In these instances, the valid data may be moved to a new block (thus adding another write count to the memory cells). When compounded over many similar cycles, performance may be degraded due to the storage device constantly spending time and processing power to determine the presence of valid data within a memory block scheduled for deletion, copy the data to a buffer, and then write the data to a new memory block within the storage device.

This disclosure is not limited to the two dimensional and three-dimensional memory arrays as described in FIG. 3 and FIG. 4 but can cover all relevant memory structures as understood by one skilled in the art. Other three-dimensional arrays are possible, such as a NAND string formed in a U-shape. Other memory arrays are possible, such as memory arrays in a NOR configuration or a memory array made of ReRAM memory cells. Multiple two-dimensional memory arrays or three-dimensional memory arrays (monolithic or non-monolithic) may be formed on separate chips and then packaged together to form a stacked-chip memory device. Multiple memory arrays may be coupled together to form the non-volatile memory of a solid state drive.

Figure 5A:
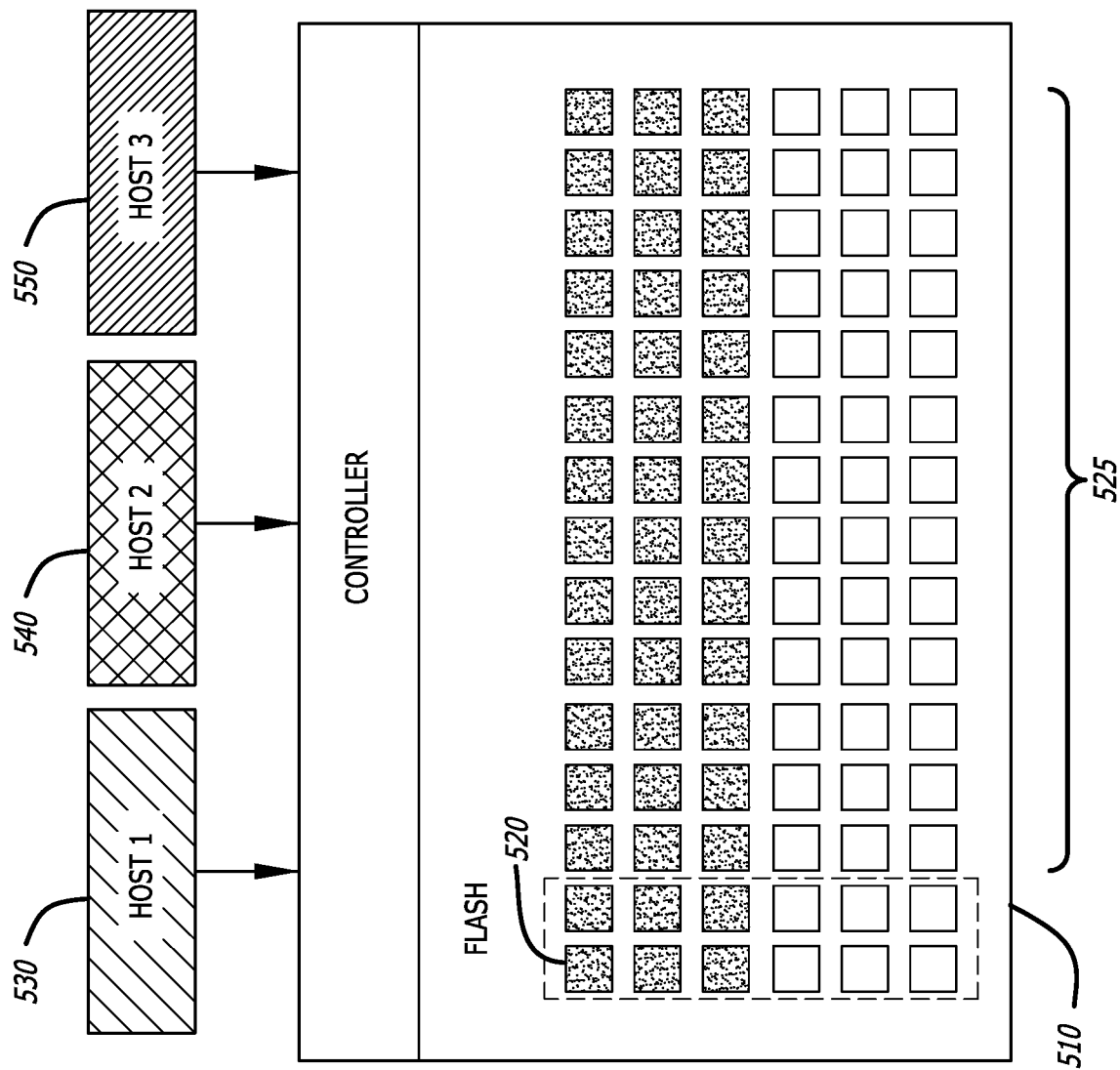
FIG. 5A is a conceptual illustration of a memory device array partitioned into control blocks and host storage blocks associated with a plurality of namespaces in accordance with an embodiment of the disclosure.

Referring to FIG. 5A, a conceptual illustration of a memory device array partitioned into control blocks 520 and host memory blocks 525 associated with a plurality of logical namespaces in accordance with an embodiment of the disclosure is shown. In various embodiments, a storage device 510 may be in communication with a plurality of host computing devices 530, 540, 550. The storage device 510 may utilize the NVMe specification for communication with the various hosts 530, 540, 550. In those embodiments, a logical namespace (ZNS) command set can be utilized which is defined by the NVMe protocols. Specifically, ZNS may be allow for each zone to be sequentially written and reset explicitly. The boundaries of the zones within ZNS systems can be exposed to the host owner which may then work in tandem with the storage device to collaborate on data placement. In this way, the storage device can avoid having to manage random writes and can therefore implement more efficient operations.

As discussed above, control blocks are often blocks of memory within the memory array that have been set aside to store control data related to and/or required to operate the storage device. In many embodiments, control data includes logical-to-physical (L2P) mapping data. To accurately locate data within the storage device based on logical location information understandable to the host computing device (and typically the host's operating system), a controller of a storage device may maintain a logical-to-physical data address translation table, (L2P table) stored as L2P data. The L2P table can associate each logical data address used by the host with a respective physical block address used internally by the controller of the storage device. The storage device controller may also maintain a log list that dynamically chronicles updates to the various logical-to-physical address mappings in the L2P table. As those skilled in the art will recognize, the need for L2P data can be in response to various factors including, but not limited to, the varying units of data writing and erasing discussed previously, requiring the shuffling of valid data between various memory block locations within the storage device throughout the lifespan of the valid data.

This type of data is often stored within control blocks 520 which are partitioned within a separate section of memory devices from the host memory blocks 525 which store the actual data sent by the host. In a number of embodiments, the storage device allocates a fixed number of memory blocks as control blocks in relation to the storage device capacity. By way of example and not limitation, a storage device with five-hundred gigabytes of host storage available may allocate forty memory blocks for use as control blocks.

As the storage device is utilized and filled with data from various hosts, issues may start to arise. Traditional methods of control block management mix control data associated with each host on all control blocks. In this way, a single control block may have control data associated with multiple hosts. In some traditional methods, control data is written sequentially to the available control blocks as it is received and/or generated.

However, traditional methods of control block management may fail to account for what those skilled in the art can refer to as the "noisy neighbor" problem. In these scenarios, one host out of multiple hosts utilizing the same storage device begins to issue an increased number of overwrite, or other commands which start to affect control block usage. For example, if a high-volume host issues multiple erase commands frequently, this can increase the amount of memory blocks that need to be, moved, compacted or otherwise garbage collected. This, in turn, can lead to decreased access times for other hosts as their control block data is being shuffled within the available control blocks due to the high-volume host's actions. In other instances, the work to compact and garbage collect the pool of control blocks 520 can lead to decreased usage for the other hosts simply due to the processing cycles required for those operations. As such, in many embodiments, control blocks 520 are managed in such a way to reduce or eliminate the need for compactions and/or garbage collection within the pool of control blocks 520. Specific methods of control block management that achieve these goals are described in more detail below.

Figure 5B:
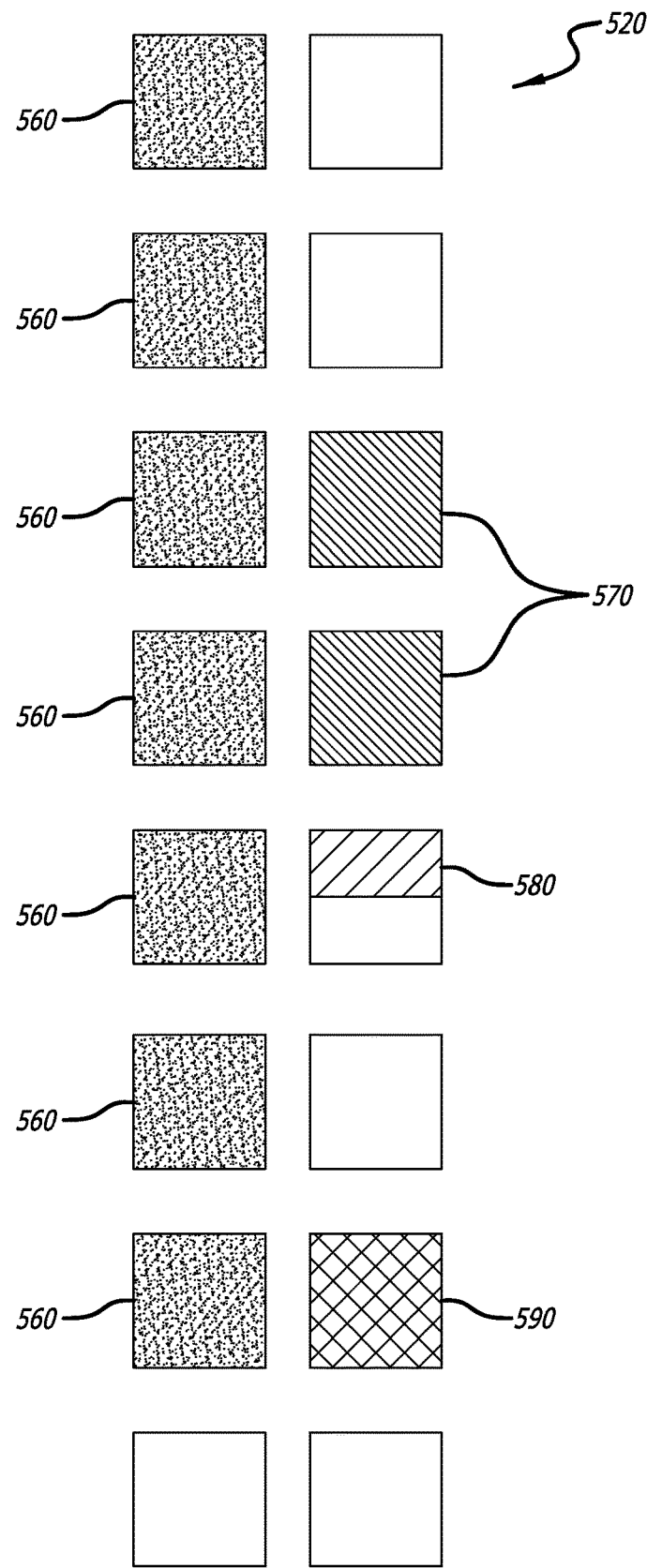
FIG. 5B is a conceptual illustration of a general pool of control blocks being managed and associated with a plurality of host namespaces in accordance with an embodiment of the disclosure.

FIG. 5B is a conceptual illustration of a general pool of control blocks 520 being managed and associated with a plurality of host namespaces in accordance with an embodiment of the disclosure. The pool of control blocks 520 depicted in FIG. 5B may be similar to those depicted in FIG. 5A. In various embodiments, a plurality of mixed control blocks 560 may already exist within the general pool of control blocks 520. Mixed control blocks comprise memory blocks with control data associated with multiple hosts.

The following examples may correspond to the embodiment depicted in FIG. 5A but may be generalized to apply to any number of embodiments. In many embodiments, the storage device may receive a command from a host to generate a new logical namespace within the memory array. The storage device, through the controller or a control block management logic, may analyze the host command and determine that the new logical namespace will require a particular number of control blocks to be associated with that logical namespace. Instead of adding or appending the determined number of control blocks and/or control data to the already established mixed control blocks 560, the storage device can establish a separate partition of control blocks to store the control data for that particular logical namespace.

In the example depicted in FIG. 5B, the storage device 510 (FIG. 5A) has received a command from host 3 550 (FIG. 5A) to generate a new logical namespace which is determined to require two control blocks worth of space. In response, the storage device 510 (FIG. 5A) partitions two control blocks 570 that will be limited to only be used and/or associated to that particular logical namespace. In this way, the actions of the other hosts 530, 540 (FIG. 5A) will not affect the operation of the separated control blocks 570, thus avoiding the noisy neighbor problem.

In further embodiments, some storage devices have been developed that may utilize sub-block technology which can provide a means of erasing partial memory blocks instead of an entire memory block. One of the benefits of this type of memory functionality is that embodiments of the current disclosure can generate one or more sub-control blocks which can provide additional granularity when managing control block operations.

In the example depicted in FIG. 5B, the storage device 510 (FIG. 5A) has received a command from host 1 530 (FIG. 5A) to generate a new logical namespace which is determined to require only half of one control block worth of space. In response, the storage device 510 (FIG. 5A) partitions only one half of one control block to create a sub-control block 580 that will be limited to only be used and/or associated to that particular logical namespace. It is contemplated that usage of sub-control blocks can be utilized within other non-sub-control block arrangements. For example, a newly requested logical namespace may be determined to require one and a half control blocks, allowing for a sub-control block to be added to a full control block. In this way, the size of separated control block partitions may be set to any size or portion available within the storage device.

In additional embodiments, the storage device may be able to utilize one or more hints that may allow for the determination of usage within a newly requested logical namespace. In certain embodiments, the usage hints may be delivered directly from the host computing device within the command to generate the logical namespace. In some embodiments, the storage device may be able to generate hints by gathering and analyzing data via past usage patterns of the host. Hints may be useful in determining the potential size of the control blocks that will be needed for the newly requested logical namespace and/or if the control blocks should be partitioned separate from any mixed or other control blocks.

For example, hints could be related to the overall usage of the allocated memory devices. In various embodiments, a host may write data to the memory devices in a mostly sequential order. Additionally, hosts may also write the data and rarely update and/or overwrite the stored data. Usage patterns such as this can often benefit from having separate partitioned control blocks as access to that sequential data will be faster to access compared to control data stored on mixed blocks that may need to be accessed in a wider variety of physical locations within the pool of control blocks. Conversely, data that is stored and accessed randomly or with a low sequential order and/or high frequency of overwrites may not benefit from separate partitions and may thus be assigned to one or more mixed control blocks.

Another example of hints that may be used in determining control block management can be related with data expiration. In a number of embodiments, data stored for certain uses may only be relevant for a predetermined length of time. Thus, when the window of validity has expired, the data within the memory devices will no longer become valid and be schedule for deletion or overwrite, as well as their associated control blocks. In these cases, the storage device may partition one or more separate control blocks associated with the expiration indications of the data.

In the example depicted in FIG. 5B, the storage device 510 (FIG. 5A) has received a command from host 2 540 (FIG. 5A) to generate a new logical namespace which is determined to comprise data that will only be valid for one hour. In response, the storage device 510 (FIG. 5A) partitions one control block 590 that will expire in one hour and will be limited to only be used and/or associated to that logical namespace and/or other logical namespaces with similar expiration times. For example, if multiple logical namespaces are requested for generation with expiration times of the same length, then the storage device may pool those logical namespaces with similar expiration indications and store their control data within the same control block. In other embodiments, the storage device may, in response to receiving a new logical namespace generation request, poll the remaining times available within the current expiring control blocks and pool newly requested logical namespace control data within control blocks that have already been established and also expire within a predetermined window of time. The amount of variability within the time of this window can be dynamically adjusted based on various factors such as, but not limited to, number of control blocks remaining, size of control data within the control blocks, and/or length of time until expiration.

As described above, hints may be received directly from the host. The logical namespace generation command may include one or more tags/metadata that indicate an expiration date of the data. Commands may also include direct indications of sequential or random usage for the newly requested logical namespace as well. In certain embodiments, the storage device may utilize one or more heuristics to manage control blocks in the absence of direct hints from the host(s). These heuristics may include processes for determining how many control blocks may be needed for the namespace and if the new control blocks should be partitioned from any other control blocks or not. The variability of the heuristics may include, but are not limited to, analyzing the remaining control blocks available, and/or gauging the current arrangement of control data within the control blocks.

In various embodiments, one or more aspects of control block management may be determined by a machine learning-based process. For example, some storage devices may store and/or log evaluation data related to the past usage of the storage device. This may include, for example, the number of logical namespaces requested, the usage patterns of those previous logical namespaces, the hosts requested each logical namespace, the average lifespan of each logical namespace, etc. The machine learning processes may be able to access and utilize historical evaluation data stored within the storage device to generate a more accurate determination regarding control block size and partitioning status.

As those skilled in the art will recognize, the embodiments depicted in FIGS. 5A-5B are presented to conceptually illustrate the concept of control blocks. As such, embodiments can exist that utilize many more hosts, many more memory devices, and zones and control block pools that can vary in size and shape as needed. In many embodiments, the zones and control blocks may be dynamically adjusted and/or resized in response to changing usage patterns. In further embodiments, the storage device may be configured to separate and partition each logical namespace to avoid any mixed blocks within the general control block pool.

Figure 6:
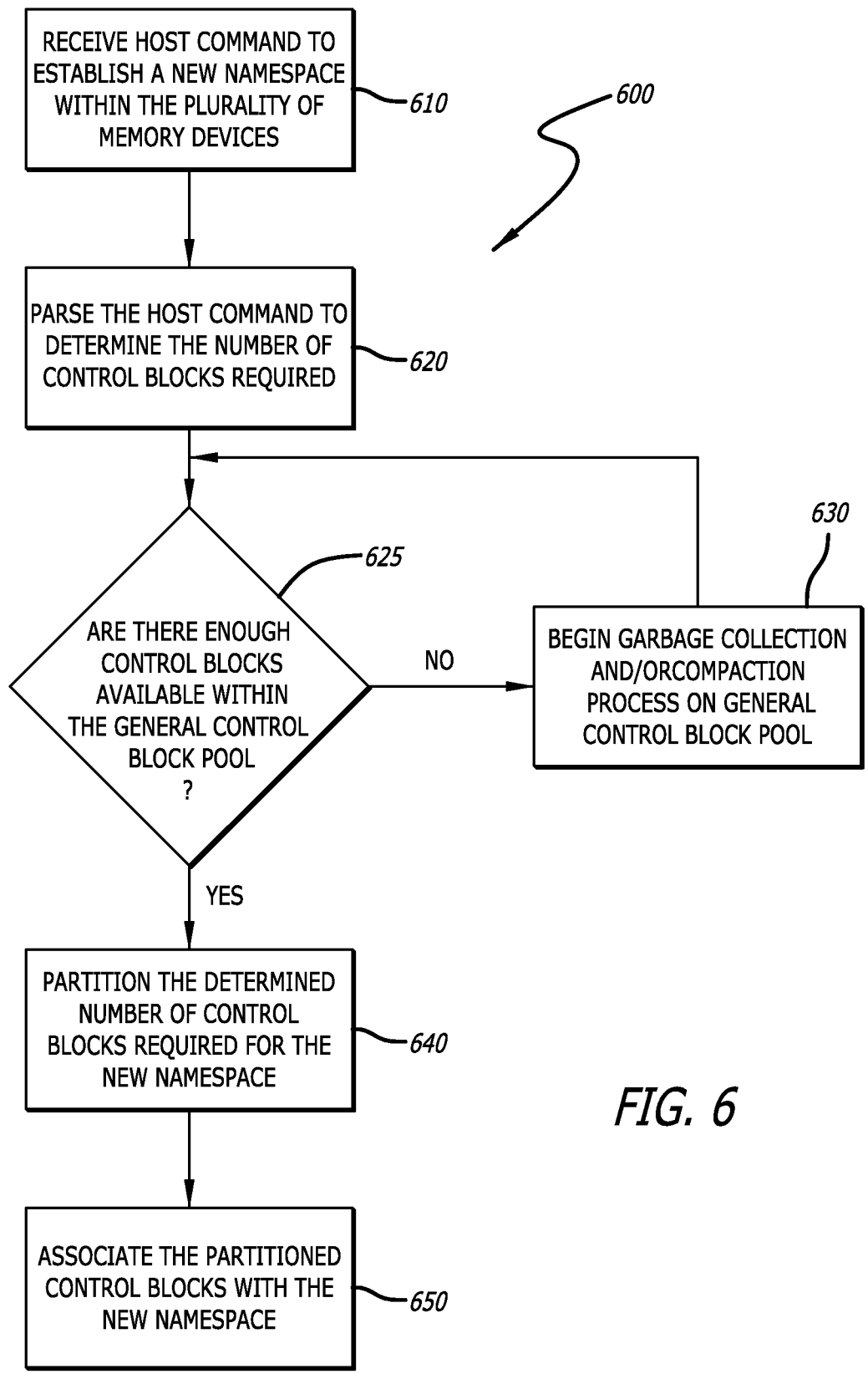
FIG. 6 is a flowchart depicting a process for partitioning and associating separate control blocks for a newly requested namespace in accordance with an embodiment of the disclosure.

Referring to FIG. 6, a flowchart depicting a process 600 for partitioning and associating separate control blocks for a newly requested namespace in accordance with an embodiment of the disclosure is shown. In a number of embodiments, a storage device may receive a host command to establish a new logical namespace within the plurality of memory devices (block 610). The host command can then be parsed to determine the number of control blocks required (block 620). As discussed above, the storage device can often determine the relative size of control data needed based on the requested zone size and relative portion compared to the overall storage capacity of the storage device.

Once the number of required control blocks is determined, the storage device can assess whether there are enough control blocks available within the general control block pool (block 625). When the capacity of the storage device is nearing its limit, there may be instances where not enough control blocks are available for the creation of separate control blocks. In these instances, the storage device can begin garbage collection and/or compaction on the existing control blocks (block 630). As those skilled in the art will recognize, the decision on which method to utilize to clear up control block space will depend on the specific state of the existing control blocks and what method will best increase free space upon completion. This may be done through one or more heuristics, selected based on an evaluation of a machine learning-based process, or can be hard-wired based on the design of the storage device. Upon completion of this process, the evaluation of the available control blocks can be undertaken again to verify if sufficient control blocks are now available for use by the requested logical namespace.

Once the available control block space is available, the storage device can partition the determined number of control blocks required (block 640). In many embodiments, the partitioning is done on one or more separate control blocks and are often removed from any previously utilized control blocks to increase overall usage efficiency. Often, the control block memory devices are partitioned sequentially to use one or more adjacent or otherwise linked control blocks.

Once partitioned, the storage device can associate the newly partitioned control blocks with the newly requested logical namespace (block 650). This assignment is often exclusive such that only control data associated with the requesting host/namespace is allowed to be stored within the partitioned control blocks. Upon filling, garbage collection/compaction operations are executed on those partitioned control blocks such that usage patterns related to that host may only affect that host instead of other hosts/namespaces.

Figure 7:
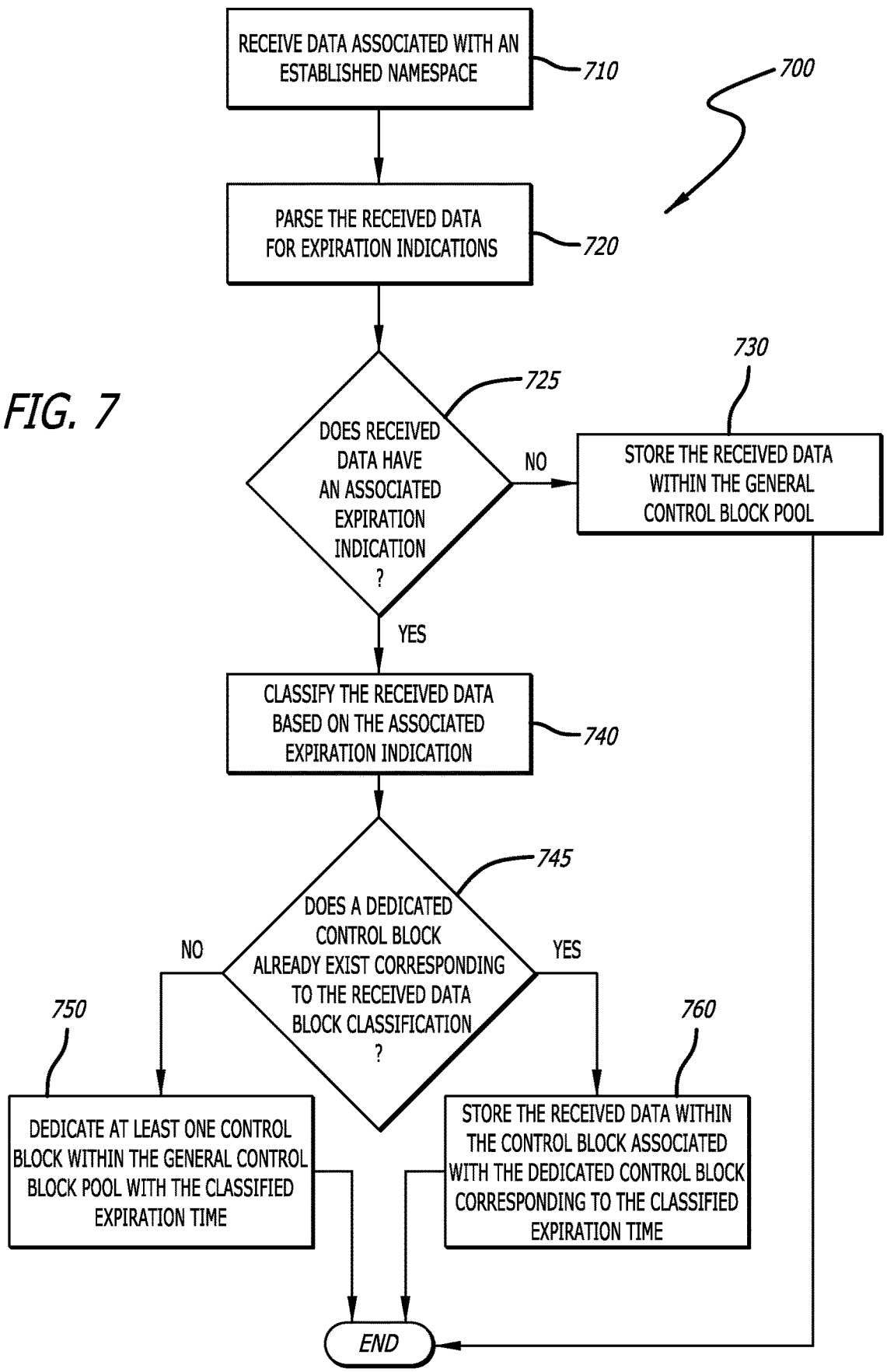
FIG. 7 is a flowchart depicting a process for managing control blocks for data associated with one or more expiration indications in accordance with an embodiment of the disclosure.

Referring to FIG. 7, a flowchart depicting a process 700 for managing control blocks for data associated with one or more expiration indications in accordance with an embodiment of the disclosure is shown. As discussed above, the storage device may either receive or derive hints that can allow it to better manage control blocks within the general control block pool. Examples previously given include determining control data expiration indications or whether the usage patterns will be sequential or random in nature. The process 700 highlights some embodiments that receive sets of data that expire within a larger namespace.

The process 700 depicted in FIG. 7 can begin upon a storage device receiving data associated with a previously established namespace (block 710). It is also contemplated that similar processes may also receive commands to generate an entirely new logical namespace instead of just data associated with a previously generated namespace. The received data can be parsed for expiration indications (block 720). As previously disclosed, indications may include hints that are received directly from the host as additional tags and/or metadata that can indicate a useful lifespan of the data. In other embodiments, the indications may be generated within the storage device based on various methods to process received data.

The storage device can then determine if the received data does have an associated expiration indication (block 725). When no expiration indications are found, the storage device can store the received data within the general control block data pool (block 730). In certain embodiments, only a portion of the received data will be stored. For example, the stored data can be limited to comprising the control information associated with the received data, which may or may not be generated separately from the received data. In some embodiments, the general control block data pool can comprise mixed control blocks that themselves comprise control data related to a plurality of hosts and/or logical namespaces. However, if the received data does have one or more associated expiration indications, the data can then be classified based on those indications (block 740). In a variety of embodiments, the classification is done by sorting the time remaining until the data will be considered expired or invalid data.

Once classified, the storage device can attempt to determine if another dedicated control block already exists that corresponds to the classification of the received data (block 745). In a number of embodiments, the logical namespace may be generating a variety of time-sensitive data which may be valid for a limited time. In these instances, it would be more effective to pool all control data associated with expiring data together based on expiration time instead of creating control blocks for each type or instance of the received data.

For example, a host may generate data that is valid for one hour, which is stored and associated with a separate control block that will be valid for one hour. Thirty minutes later, a second set of data is received that is valid for thirty minutes. Instead of creating a new separate control block, the storage device can be configured to evaluate the current set of control blocks and determine if an already created control block can be utilized to store the time-sensitive data. In this way, the newly received data with thirty minute validity can be associated with the same data that originally had a sixty minute validity, but now also has thirty minute validity left before expiration. It is contemplated that associating control data does not have to be precise and based on usage patterns, the storage device can provide more ranges of acceptable correspondence between previously created control blocks and newly received data indications. For example, a newly deployed storage device may be configured to accept smaller gaps in corresponding expiration times, while a storage device that is nearly at capacity may allow more variance between expiration times prior to association in order to reduce the overall number of control blocks utilized.

If no previously existing control block comprises expiring data similar to the newly received data, the storage device can dedicate at least one control block within the general control block pool with the classified expiration time (block 750). As highlighted previously, and within the discussion of FIG. 8 below, the process 700 may utilize one or more sub-control blocks if it is deemed more efficient and is available within the storage device. If, however the storage device does determine that a control block already exists with a similar enough expiration time, the newly received data can be stored within that control block corresponding to the classified expiration time (block 760).

Figure 8:
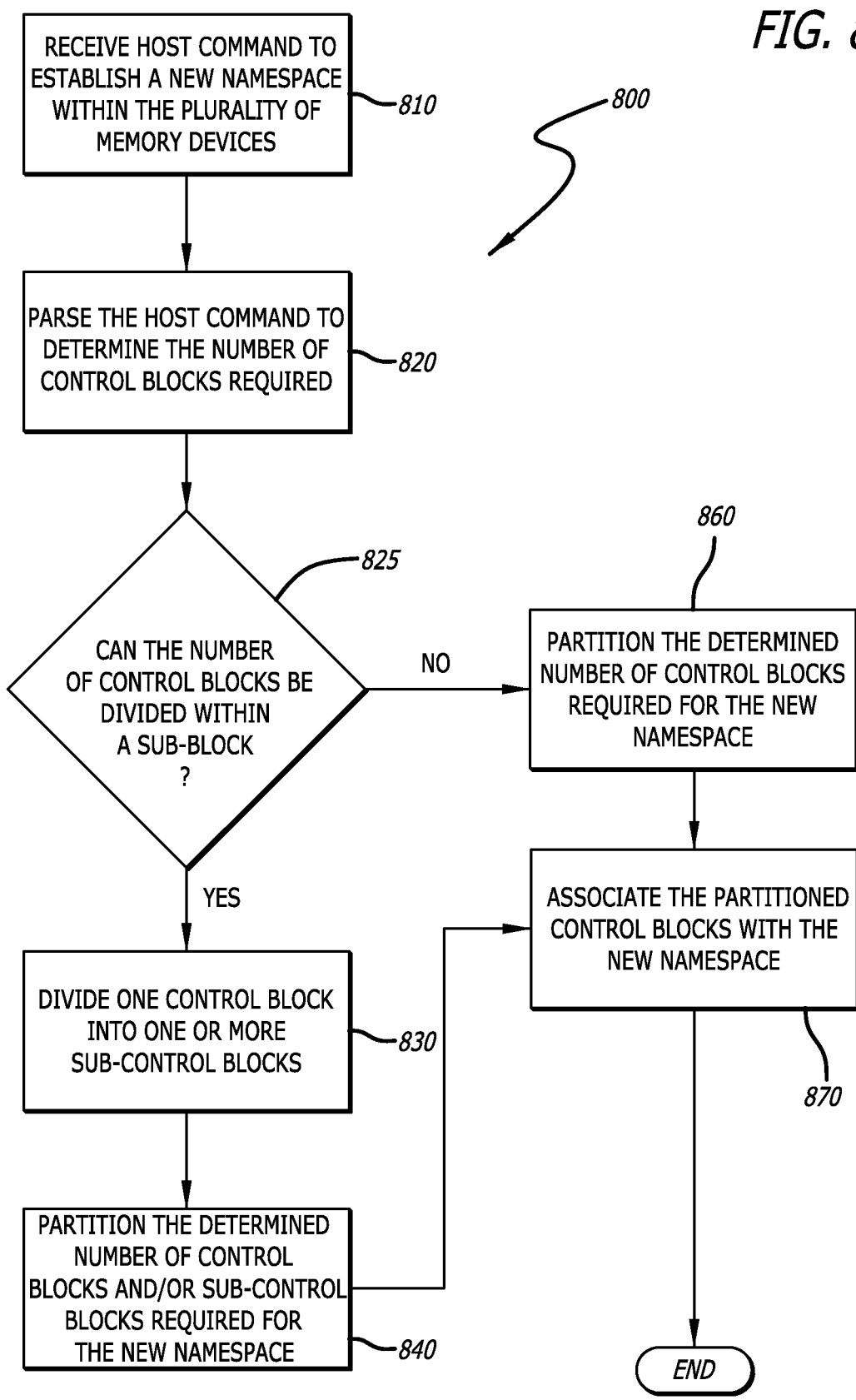
FIG. 8 is a flowchart depicting a process for utilizing sub-blocks for management of control blocks in accordance with an embodiment of the disclosure.

Referring to FIG. 8, a flowchart depicting a process 800 for utilizing sub-blocks for management of control blocks in accordance with an embodiment of the disclosure is shown. As discussed previously, traditional solid-state storage devices often have a smallest write unit of one page and a smallest erase unit of one block. However, newer storage devices are being configured that have the capability to erase data less than a block in size. This can allow for the creation of sub-blocks within memory blocks that can be partitioned and treated as separate units.

Utilizing sub-blocks with embodiments of the disclosure can begin in response to receive a host command to establish a new logical namespace within the plurality of memory devices (block 810). The received command is parsed to determine the number of control blocks that are likely to be required for the requested logical namespace (block 820). The storage device can determine if the number of required control blocks can be divided into one or more sub-blocks based on the capabilities of the storage device (block 825). A sub-control block may be formed by generating a control block unit that is less than one full memory block. The sub-control block may also be appended onto another fully utilized control block or blocks as needed to better match the amount of control data to be stored with the size of control blocks needed for that storage.

If a sub-control block is not needed, the storage device can partition the determined number of control blocks required (block 860). If one or more sub-control blocks are determined to be required, then the storage device can select and divide a control block into the one or more sub-control blocks (block 830). Once divided, the storage device can partition the determined number of control blocks and/or sub-control blocks required for the new logical namespace (block 840). The partitioned control block(s) can then be associated with the requested logical namespace (block 870).

Figure 9:
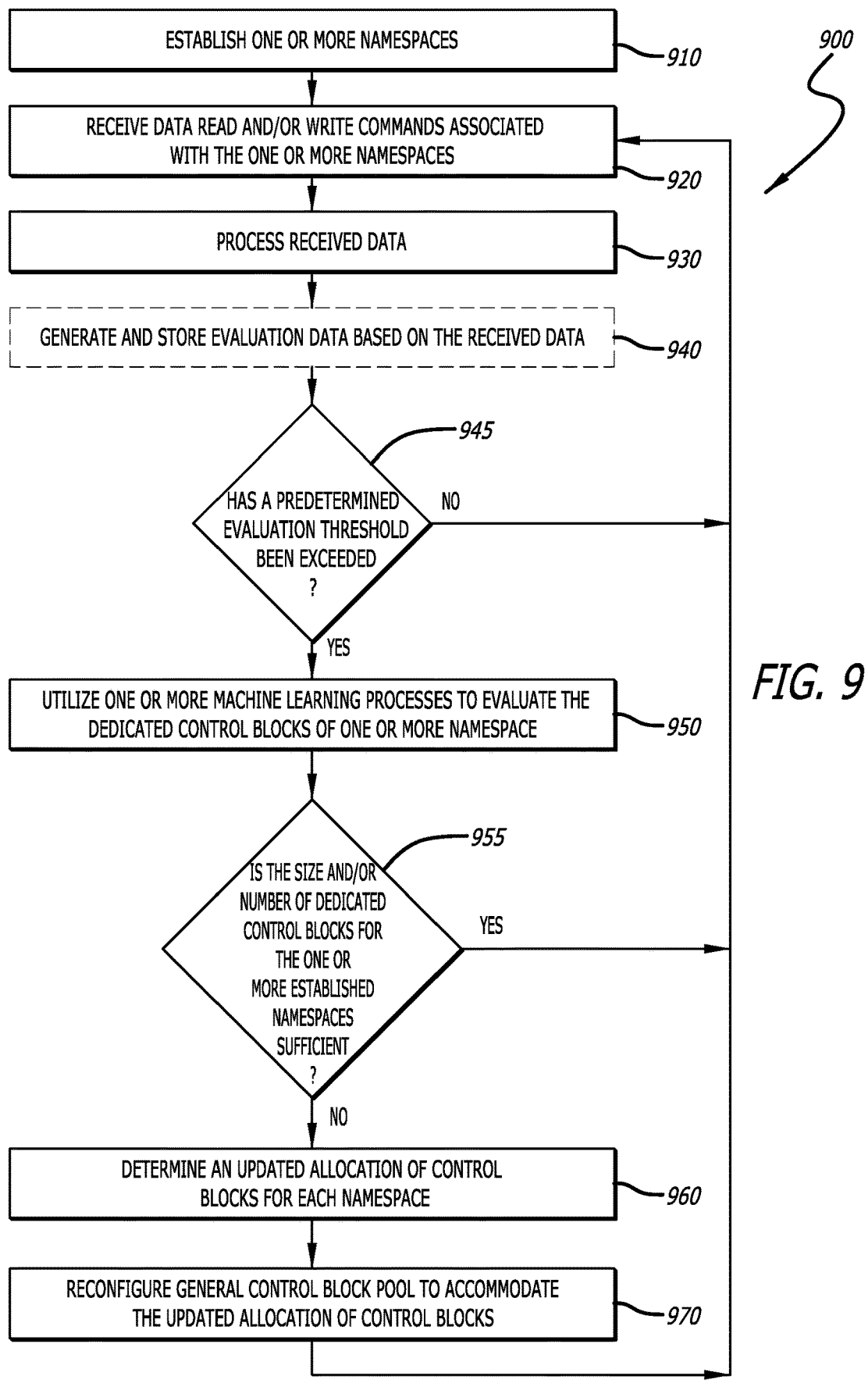
FIG. 9 is a flowchart depicting a process for utilizing machine learning processes within control block management in accordance with an embodiment of the disclosure.

Referring to FIG. 9, a flowchart depicting a process 900 for utilizing machine learning processes within control block management in accordance with an embodiment of the disclosure is shown. In various embodiments, the utilization of machine learning-based processes can enhance the process of managing control blocks. As discussed above, machine learning processes can attempt to utilize historical evaluation data related to past usage of the storage device to better determine the proper size and usage of control blocks. In further embodiments, such as the embodiment of FIG. 9, the storage device can utilize machine learning processes to periodically evaluate previously established logical namespaces to verify that the current usage of the control blocks is optimized. When necessary, the storage device may determine that reconfiguring of the general control block pool is necessary.

The process 900 can begin when a storage device first establishes one or more logical namespaces (block 910). In certain embodiments, these logical namespaces may already be configured with dedicated and separate control blocks within the general pool of control blocks. Once established, normal usage can occur, and data related to the logical namespace including data read/write commands (block 920). The received data can be processed in a variety of ways (block 930). While the received data is obviously used to carry out the commands requested by the host to read and/or write data, the received data, such as command data, can sometimes be stored and or utilized to generate evaluation data that can be stored within the storage device (block 940). Evaluation data can simply be a log of events, or can be any type of scored and/or processed data that can indicate states or behaviors of the host and the logical namespace.

Over time, the storage device can examine if a predetermined evaluation threshold has been exceeded (block 945). This evaluation can be done after over a fixed period of time or after the reception and/or execution of each host command. The predetermined threshold can be any type of threshold but may include, for example, a specific number or percentage of write cycles of the storage device, a specific number of received host commands, a period of time elapse, and/or the receipt of a specific type of command. Those skilled in the art will recognize that many types of predetermined thresholds may be utilized as needed based on the desired application and/or configuration of the storage device and its deployment environment.

If the predetermined threshold has not yet been exceeded, the process 900 can keep repeating by waiting for newly received data from the host to process until the threshold has been exceeded. When the predetermined threshold has been exceeded, the storage device can utilize one or more machine learning processes to evaluate the dedicated control blocks of one or more logical namespaces (block 950). The machine learning processes can utilize any evaluation data if available. By utilizing all available data, the machine learning processes can determine if the size and/or number of dedicated control blocks for the one or more established namespaces under evaluation is sufficient (block 955). The machine learning process, if it is determined that the current allocation of control blocks is not sufficient, can either determine or call for a determination of a new reconfiguration or allocation of the control blocks for each namespace based on the evaluation done (block 960).

If it is determined that the current allocation of control blocks is sufficient for the logical namespaces under evaluation, the process 900 can return to waiting and receiving data from the host until the predetermined threshold is reached again and another evaluation is undertaken (block 920). However, if it is determined that the current allocation is not sufficient, the storage device can reconfigure one or more control blocks and/or the entire general control block pool to accommodate the updated allocation of control blocks (block 970). Once completed, the process 900 can again go back to a state of receiving data and evaluating for another threshold to be exceeded, triggering a subsequent re-evaluation (block 920).

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device comprising:
   a processor;
   a memory array comprising:
      a plurality of memory devices;
      a plurality of host storage memory devices associated with a plurality of namespaces; and a plurality of control blocks; and
a control block management logic configured to:
  process a request to generate a new namespace;
  parse the namespace request to determine the number of control blocks required;
  wherein an indication of use related to a potential expiration time is established prior to determining the number of control blocks required;
  classify data associated with the namespace based on the indication of use;
  assess whether enough control blocks are available within a general pool of control blocks;
  partition separate control blocks for the requested namespace;
  assign the control blocks to the requested namespace; and
  limit further control block activity for the partitioned control blocks to control data associated with the requested namespace, wherein the control block management logic is configured to assess whether enough control blocks are available based at least in part on analyzing current arrangement of control data within the control blocks.

2. The device of claim 1, wherein, in response to an insufficient amount of available control blocks for partitioning within the storage device, the control block management logic is further configured to initiate a garbage collection process within the general control block pool.

3. The device of claim 1, wherein, in response to an insufficient amount of available control blocks for partitioning within the storage device, the control block management logic is further configured to initiate a compaction process within the general control block pool.

4. The device of claim 1, wherein the partitioning of separate control blocks is executed on previously unused control blocks.

5. A device comprising:
a processor;
a memory array comprising:
  a plurality of memory devices;
    a plurality of host storage memory devices associated with a plurality of namespaces; and
    a plurality of control blocks;
  a control block management logic configured to:
    process a request to generate a new namespace;
    parse the namespace request;
    assess whether enough control blocks are available within a general pool of control blocks;
    establish if any indications of use related to a potential expiration time are available prior to determining a number of control blocks required based on the namespace request;
    classify data associated with the namespace based on the indication of use;
    partition separate control blocks for the requested namespace;
    assign the control blocks to the requested namespace; and
    limit further control block activity for the partitioned control blocks to control data associated with the requested namespace, wherein the control block management logic is configured to assess whether enough control blocks are available based at least in part on analyzing current arrangement of control data within the control blocks.

6. The device of claim 5, wherein the indications of use are derived from the host.

7. The device of claim 6, wherein the indications of use are provided via one or more tags within the namespace generation command.

8. The device of claim 7, wherein the one or more tags indicate an expiration indication associated with the host data.

9. The device of claim 8, wherein control block management logic is further configured to utilize the expiration indication to determine if a previously generated control block exists within a given window of time associated with the expiration indication.

10. The device of claim 9, wherein, in response to a previously generated control block existing within the given window of time associated with the expiration indication of the requested namespace, the control block management logic is further configured to utilize the existing control block instead of partitioning separate control blocks.

11. The device of claim 10, wherein the indications of use are generated based on historical use data associated with the host stored in the storage device.

12. The device of claim 5, wherein the indications of use are derived within the storage device.

13. The device of claim 5, wherein the indications of use are configured to determine if the requested namespace will be utilized sequentially or randomly.

14. The device of claim 13, wherein, in response to the determination of a logical namespace being utilized randomly, the control block management logic is further configured to associate the requested zone namespace to one or more pre-existing mixed control blocks.

15. A method of managing control blocks within a storage device, comprising:
  processing a request to generate a new namespace within a memory array of the storage device;
    establishing an indication of use related to a potential expiration time prior to parsing the namespace request to determine a number of control blocks required;
    classifying data associated with the namespace based on the indication of use;
  assessing whether enough control blocks are available within a general pool of control blocks;
  determining that the number of control blocks required comprises at least one unit that is less than one full control block;
  partitioning a sub-block for the requested namespace when the memory devices of the memory array are configured to be erasable in units of less than one block;
  partitioning any remaining full control blocks required for the requested namespace;
  assigning the control blocks to the requested namespace; and
  limiting further control block activity for the partitioned control blocks to control data associated with the requested namespace, wherein the assessing whether enough control blocks are available is performed based at least in part on analyzing current arrangement of control data within the control blocks.

16. The method of claim 15, wherein determining the number of control blocks required includes evaluating any expiration indications available with the requested namespace.

* * * * *